F. G. LINDSAY.
SALES CHECK.
APPLICATION FILED APR. 20, 1909.

948,178.

Patented Feb. 1, 1910.

UNITED STATES PATENT OFFICE.

FRANKLIN G. LINDSAY, OF GREENSBURG, PENNSYLVANIA, ASSIGNOR OF ONE-HALF TO SOLOMON C. LINDSAY, OF GREENSBURG, PENNSYLVANIA, AND ONE-HALF TO JAMES S. BRADDOCK, OF MOUNT PLEASANT, PENNSYLVANIA.

SALES-CHECK.

948,178. Specification of Letters Patent. Patented Feb. 1, 1910.

Application filed April 20, 1909. Serial No. 491,120.

*To all whom it may concern:*

Be it known that I, FRANKLIN G. LINDSAY, a citizen of the United States, residing at Greensburg, in the county of Westmoreland and State of Pennsylvania, have invented certain new and useful Improvements in Sales-Checks, of which the following is a specification.

The present invention is in the nature of a sales check such as can be sold by the proprietor of a store or combination of stores to the patrons thereof, the said check having suitable characters upon opposite faces thereof and the said characters bearing such relation to each other that when the total amount of a purchase has been punched upon one side of the check, the amount still due to the holder of the check will be simultaneously punched upon the opposite face thereof.

The object of the invention is the provision of a check of this character in which the characters upon the opposite faces thereof are arranged in a peculiar manner so as to be easily and accurately punched and so as to indicate at a glance without the necessity of any arithmetical computation the exact amount which has been purchased and also the exact amount which is still due.

For a full understanding of the invention, reference is to be had to the following detail description, and to the accompanying drawings, in which—

Figure 1 is a plan view of one of the sales checks, and Fig. 2 is a similar view showing the back or credit side of the check.

Throughout the following detail description, and on the several figures of the drawings similar parts are referred to by like reference characters.

Referring to the drawings, the numeral 1 designates one of the checks which are preferably formed in sheets not shown so as to be readily bound in book form. A stub 3 is provided for each of the checks, and is separated therefrom by a tear-line 2.

Printed upon the front or debit face of each of the checks is a border 5 and arranged within both the upper and lower portions of the space inclosed by this border are the rows of spaces 6 within which suitable characters are placed to indicate the amount of a purchase. As shown in the drawings there are two rows of these spaces 6 at both the top and bottom of the check and the numerals within the spaces run consecutively from left to right, the highest numeral indicating the total value for which the check was issued. The central portion of the check is designed to receive the necessary data for identifying the same and is shown as provided with a blank space to receive the date when the check was issued, and also the blank space to receive the name of the person to whom the check was issued. The number of the check, the value of the check, in the present instance $1.00, the person by whom the check was issued, and any other desired matter may also be marked in this space. The stubs 3 are numbered to correspond with the respective checks and are also provided with spaces to receive the date, the name of the person to whom the check is issued, and the agent or person by whom the check was issued. The amount of the check and the number of the book may also be marked upon the stub if desired.

The back or credit face of each of the sales checks has a border $5^a$ marked thereon corresponding to the border 5 on the debit face of the check, and arranged within both the upper and lower portions of the space inclosed by this border $5^a$ are the rows of spaces $6^a$ to receive the characters for designating the balance still due upon the check after a purchase has been made. The central portion of the credit face of the check has a space 7 which may be of any desired shape to receive the stamp of the issuing office. Any other desired data, such as the names of the stores wherein the check is good may also appear upon this side thereof.

At this point it is desired to direct attention to the fact that the two faces of the check are printed in a reverse manner so that the bottom of the debit face of the check is the top of the credit face. It will also be observed that the numerals within the spaces $6^a$ upon the credit face of the check run consecutively from right to left and range from zero to one less than the total value of the check. The numerals appearing in the corresponding spaces 6 and $6^a$ upon the opposite faces of the check bear such a relation to each other that their sum is equal to the total value of the check. It will thus be obvious that when the amount of a purchase is punched upon the debit side of the check, the balance still due upon the check will be simultaneously punched upon the credit side thereof.

The check shown in the drawings has the numeral 10 upon the debit face thereof punched, indicating that a purchase amounting to ten cents has been made. By observing the back or credit face of the check it will be observed that the numeral 90 was simultaneously punched, this numeral indicating that the sum of ninety cents is still due on the check. Should the holder of the check make an additional purchase of thirty-two cents, the numeral forty-two upon the debit side would be punched, and this same punch would indicate upon the back of the check as in the previous instance that fifty-eight cents was still due thereon. In this manner it will be obvious that as the punches are made for the various purchases each punch serves in its turn to indicate upon one side of the check the total amount which has been purchased and upon the opposite side of the check the amount still due to the holder thereof.

While the present checks are shown as having a valuation of one dollar, it will be obvious that the checks could be made for any other value as might be desired, without departing in any manner from the spirit of the invention.

Having thus described the invention, what is claimed as new is:

1. A sales check having total value indicia thereon, and embodying opposite debit and credit faces, the debit face of the check having consecutive numerals arranged opposite to corresponding consecutive numerals provided on the credit face, the combined amount represented by each set of opposite consecutive debit and credit numerals being equal to the total cost of the check, whereby when the debit numeral is punched its opposite credit numeral will be punched, said punched credit numeral indicating the credit balance due the holder of the check.

2. A sales check having opposite credit and debit faces, said faces having rows of opposite numerals thereon, the numerals upon the debit face running consecutively from left to right while the numerals on the credit face run consecutively from right to left in reverse order to the credit numerals and each set of opposite numerals representing a value equal to the total value of the check and thus bearing such a relation to each other that when the total amount of a purchase is indicated by punching a numeral on the debit face of the check, the credit balance still due the holder of the check will be simultaneously indicated by the punching of the credit numeral opposite the punched debit numeral.

In testimony whereof I affix my signature in presence of two witnesses.

FRANKLIN G. LINDSAY.

Witnesses:
S. C. LINDSAY,
CHAS. S. ALMS.